Figure 1:
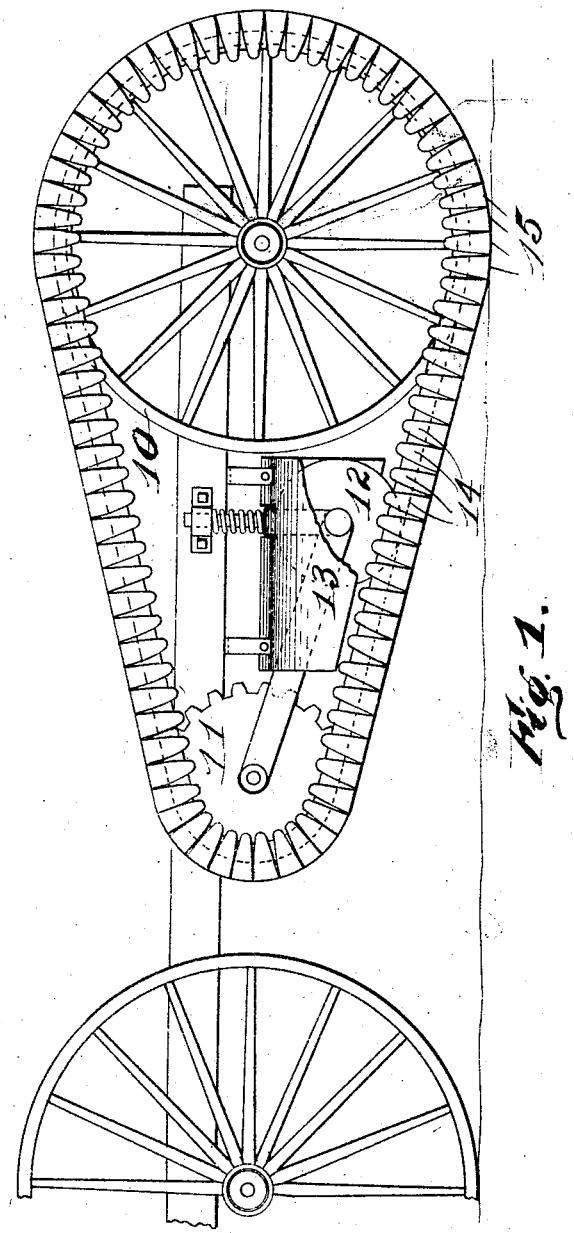

No. 699,098.  Patented Apr. 29, 1902.
T. M. BRYSON.
LINK BELT TIRE.
(Application filed July 1, 1901.)
(No Model.)  2 Sheets—Sheet 1.

WITNESSES:  INVENTOR
G. P. Baugh  Thomas M. Bryson
Eva P. Hood  BY
  ATTORNEY

No. 699,098. Patented Apr. 29, 1902.
T. M. BRYSON.
LINK BELT TIRE.
(Application filed July 1, 1901.)
(No Model.) 2 Sheets—Sheet 2.
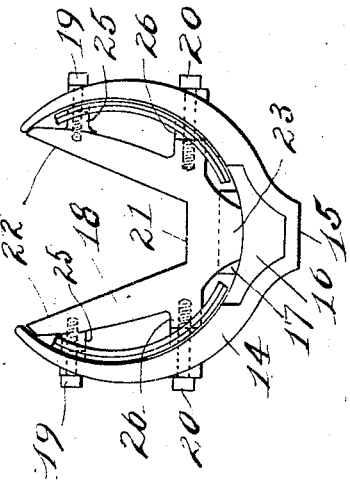
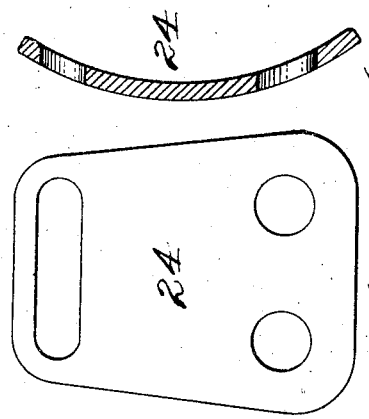
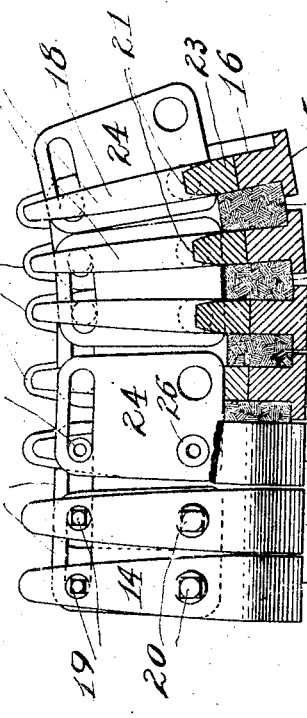
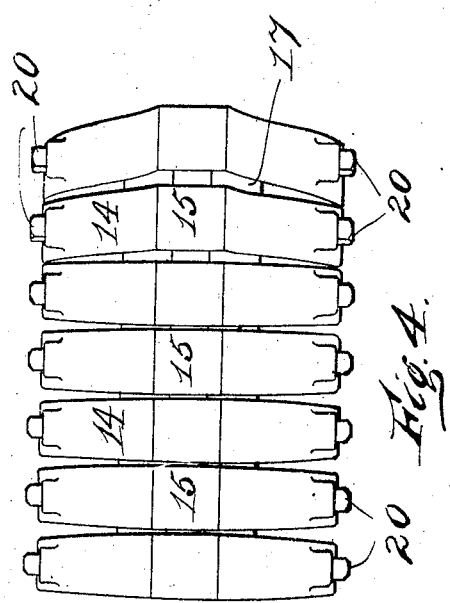
WITNESSES
G. P. Baugh
Edw. P. Wood
INVENTOR
Thomas M. Bryson
BY
ATTORNEY

UNITED STATES PATENT OFFICE.

THOMAS M. BRYSON, OF ATLANTA, GEORGIA.

LINK-BELT TIRE.

SPECIFICATION forming part of Letters Patent No. 699,098, dated April 29, 1902.

Application filed July 1, 1901. Serial No. 66,657. (No model.)

*To all whom it may concern:*

Be it known that I, THOMAS M. BRYSON, a citizen of the United States of America, and a resident of Atlanta, in the county of Fulton and State of Georgia, have made a new and useful Improvement in Link-Belt Tires; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

The invention is shown in the accompanying drawings, in which—

Figure 1 is a fragmentary side elevation of a conveyance, showing my device in operative position. Fig. 2 is a sectional detail of the tire. Fig. 3 is an end view thereof. Fig. 4 is a view of the tread. Figs. 5 and 6 are respectively side and sectional views of one of the lapping links joining the tire elements.

In the figures like reference characters are uniformly employed in the designation of corresponding elements of construction in all the views.

This device is intended, as best shown in Fig. 1, to pass partially around the rear wheel 10 and a motor-driven sprocket-wheel 11, mounted on the frame of the conveyance, and be tightened by a spring-pressed idler-roller 12, over which roller, as well as a portion of the lower half of the tire, is a mud and water shedding fender or housing 13, suitably mounted on the frame of the conveyance. In order to conform to the requirements, it is desirable that this chain be of such construction that it will engage the dentated periphery of the sprocket-wheel 11, pass around the periphery of the driving-wheel 10, with a suitable bearing thereon, and have a suitable tread adapted to contact with the ground either in hard or soft condition and with pavements of various description.

To these ends the invention consists of the device hereinafter specified.

The tread portion 14, as best shown in Figs. 2, 3, and 4, consists of a multiplicity of U-50 shaped sections, with their free ends inturned and being thickened on their lower sides, as at 15, near which they are chambered out, as shown at 16, for the purpose of receiving when assembled the elastic blocks 17, Fig. 2. From a point near the upper edge of this elastic block 17 the arms of this part 14 are tapered, so as to allow them to close up or move closer together, as shown at the right-hand end of Fig. 2, as the chain curves to conform to circular surfaces. These elements 14 are perforated for screws, as will be hereinafter explained.

The interior element consists of an approximately U-shaped casting or forging 18. The outer edge of this casting is provided with lugs adapted to receive the aforesaid screws 19 and 20, the former of which pass through the elements 14, near their free end, and screw into the elements 18, while the latter in like manner pass through the element 14 into the correlative lugs in the element 18, near the bottom thereof, and axially register with the surface 21 within the element 18, which forms a bearing for the chain against the periphery of the wheel 10. The edges 22 should diverge from their point of joinder with the surface or edge 21, so as to guide the chain. It will thus be seen that each member proper of each link of the chain consists of two parts arranged substantially in the manner specified and, further, that it is desirable that the connection between these two parts and their exact form may be varied to a considerable degree without a departure from the spirit of my invention. For better construction and a greater rigidity I have provided a projection 23 upon the lower end of the element 18, which bears normally upon the correlative surface of the element 14, thereby removing the weight of the conveyance from the screws 19 and 20 by interposing practically solid metal between the wheel 10 and the pavement. If desired, the rubber blocks 17 may extend above the chamber at 16 and lie upon or against this downward projection 23, whereby the bearing of the metal upon these elastic blocks is increased in area. It is now necessary that the chain elements thus formed be aggregated in flexible operative relation, so that the tread, where the chain is straight, will be practically continuous, and so that the metal terminating in the surface 21 will form cogs for engagement with the sprocket-wheel 11, and so that these cogs so formed may preserve a constant pitch distance. This is accomplished by means of a lap series of link-plates 24, which are slotted transversely of one edge and perforated in the opposite corners. The plate 24 is shown in Fig. 6 curved to conform to the inner contour of the elements 14. As best shown in Fig. 2, these links lap the ends of slots therein engaging the lugs 25, while the holes in opposite corners engage the lugs 26 on the elements 18. Thus it will be seen that the chain elements are fulcrumed by the lugs 26 in the holes on the plates, said fulcruming being in line with the surface 21, near which is the pitch-line of the cogs, and that the upper ends of these members 14 and 21 (joined) may move freely, due to the slots aforesaid. This plate 24 also serves to span and seal against the admission of mud and sand the openings between the members or links of the link belt so formed.

Having thus described my invention, what I claim as new, and desire to secure by Letters Patent of the United States, is—

1. In a link-belt tire, an outer U-shaped element and an inner element adapted to seat within same and form a dentation, means for securing said elements together and securing the members so formed to each other, said outer elements being gained in their contiguous faces and elastic blocks seated therein.

2. In a link-belt tire, an outer U-shaped element and an inner element adapted to seat therein, means for securing said elements together and the members so formed to each other, said outer elements being chambered in their contiguous faces and elastic blocks seated therein, said elastic blocks extending over and sealing the joints between the lower contacting faces of said elements.

3. In a link-belt tire, an outer U-shaped element and an inner element adapted to seat therein, means for connecting said elements and for connecting the members so formed to each other comprising lugs on one of said elements and perforated metallic links engaging said lugs and extending from one member to the next.

4. In a link-belt tire, an outer U-shaped element and an inner element adapted to seat therein and having a tooth formed on its bottom projecting inwardly, lugs on said inner element axially in the plane of the pitch-line of said tooth, and links engaging the lugs of contiguous pairs of said members and means for securing said elements together to form said members.

5. In a link-belt tire, an outer U-shaped element and an inner element adapted to seat therein and having a tooth formed on its bottom projecting inwardly, lugs on said inner element axially in the plane of the pitch-line of said tooth, links engaging the said lugs of contiguous pairs of said members and other lugs near the points of the arms of said inner elements, said links being also provided with a slot the ends of which normally engage the said last-named lugs, and means for securing said elements together to form members.

6. In a link-belt tire, an outer U-shaped element and an inner element adapted to seat therein and having a tooth formed on its bottom projecting inwardly, lugs on said inner element axially in the plane of the pitch-line of said tooth and links engaging the lugs of contiguous pairs of said members said links lying against the inner surfaces of said outer U-shaped elements, spanning and sealing the joints between same when assembled in the link belt, and means for securing said elements together to form said members.

In testimony whereof I hereunto affix my signature in presence of two witnesses.

THOMAS M. BRYSON.

Witnesses:
A. P. WOOD,
EDWD. P. WOOD.